United States Patent [19]

Cavage

[11] 4,121,793
[45] Oct. 24, 1978

[54] OPENING PARACHUTE

[76] Inventor: George T. Cavage, 8116 Old Lindbergh Blvd., Philadelphia, Pa. 19153

[21] Appl. No.: 850,895

[22] Filed: Nov. 14, 1977

[51] Int. Cl.² ............................................. B64D 17/52
[52] U.S. Cl. .................................................... 244/149
[58] Field of Search ............... 244/152, 149, 150, 147, 244/142, 145

[56] References Cited

U.S. PATENT DOCUMENTS 2,972,457  2/1961  Steinthal ........................ 244/152 X

FOREIGN PATENT DOCUMENTS 1,165,828  10/1958  France ..................................... 244/145

Primary Examiner—Barry L. Kelmachter
Attorney, Agent, or Firm—Robert K. Youtie

[57] ABSTRACT

A parachute having improved opening characteristics wherein a plurality of distender members are secured about the margin of the canopy for swinging movement between a collapsed position along the canopy and an opening or distending position transverse to the canopy, and flexible guying members connected to each distending member for swinging the latter to its distending position when a load is applied to the shrouds.

5 Claims, 3 Drawing Figures

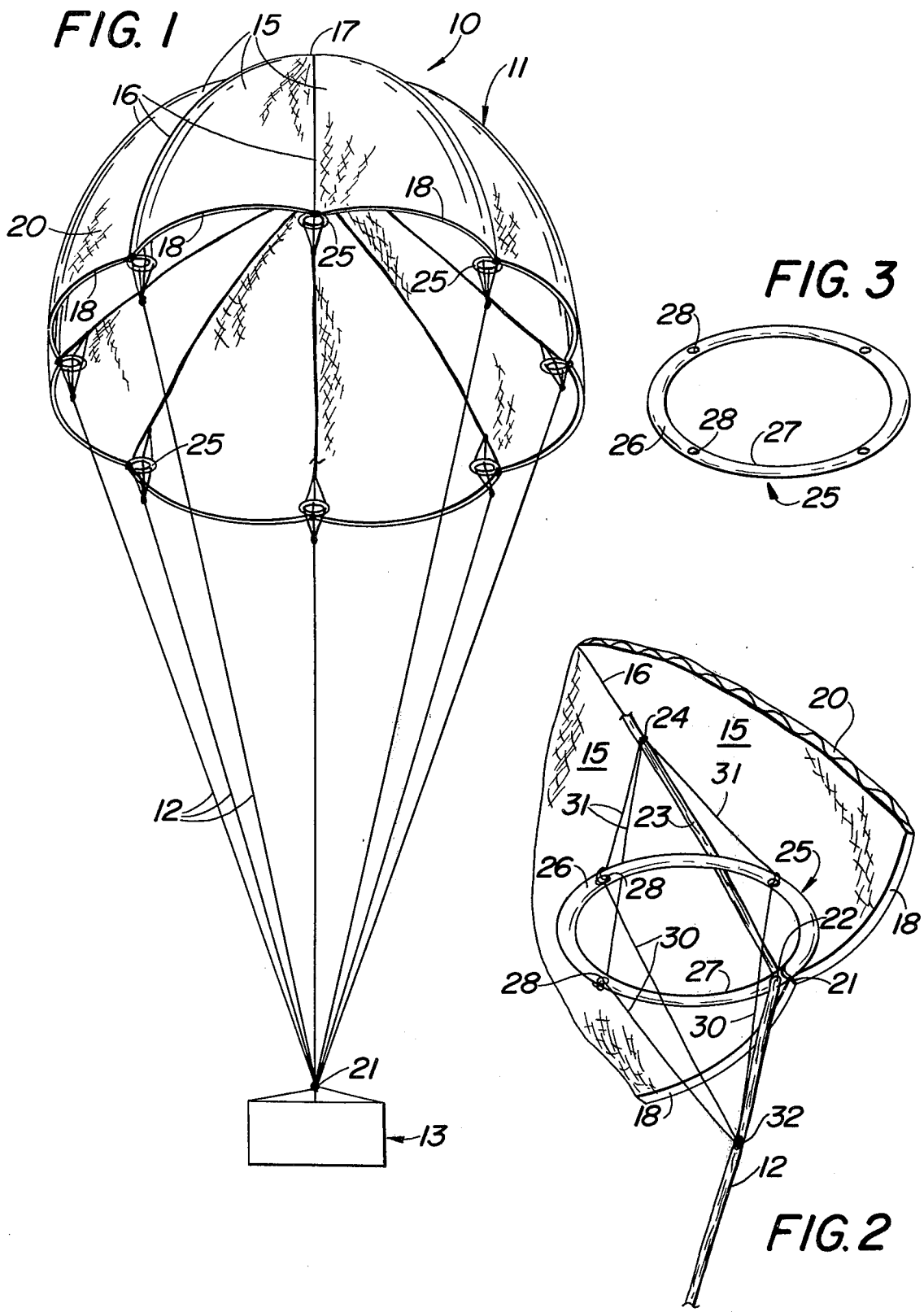

OPENING PARACHUTE

BACKGROUND OF THE INVENTION

As is well known to those versed in the art, considerable work has been done in the parachute field to insure opening of the parachute, especially the main canopy. However, prior parachute opening devices have often been relatively complex, adding appreciably to the expense of manufacture and maintenance, less than entirely reliable under practical conditions of use, and complex in refolding for reuse.

SUMMARY OF THE INVENTION

It is an important object of the present invention to provide an improved parachute construction including novel parachute opening means, which is extremely simple in structure, adding but little to manufacturing costs, quickly and easily folded for use and repeated reuse, and durable and entirely reliable throughout a long life under practical conditions of operation.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a bottom perspective view showing a parachute constructed in accordance with the teachings of the present invention, in an open operative condition of use.

FIG. 2 is a partial perspective view, similar to FIG. 1 but enlarged, for clarity of understanding.

FIG. 3 is a perspective view showing a distender member of the present invention apart from the parachute.

DESCRIPTION OF THE PREFERRED EMBODIMENT

Referring now more particularly to the drawings, and specifically to FIG. 1 thereof, a parachute is there generally designated 10, and is illustrated in an open, descending, operative condition of operation, as including a flexible dome or cover 11 and a plurality of guy lines or shrouds depending from the canopy to a pay load or weight 13.

The canopy or dome 11 may be fabricated substantially entirely of flexible sheet material, such as woven of synthetic yarn, or other suitable material, and constituted of a plurality of generally triangular or sector-shaped component parts 15 arranged in contiguous radiating relationship and secured together along adjacent side edges, as at 16. Thus, the dome or canopy 11 is constituted of a plurality of triangular shaped flexible sheet panels 15 secured together in convergent relation toward a central peak or top region 17. The triangular panels may be considered as extending radially outwardly to their outer edges 18, which combine to define a circumferential or bounding edge along the peripheral margin or marginal edge 20 extending entirely about the canopy. Thus, the canopy edge margin 20 may be considered as the surrounding or bounding edge portion of the lower region or skirt of the canopy.

Extending from each panel securement line or seam 16, at its juncture with the adjacent panel edges 18, is an elongate flexible tension member, shroud or guy line 12, all of which may be joined together at a location or juncture 21 remote from the canopy 11. In the illustrated embodiment in FIG. 1, the several shroud lines 12 depend from equiangularly spaced locations about the canopy margin 20 and converge toward the juncture 21, so as to define an inverted conical configuration. The weight or load 13 may be suitably connected to the juncture 21, and may be personnel, supplies or other, as desired.

As seen in greater detail in FIG. 2, a guy line or shroud 12 has its upper end connected to the canopy margin 20 at a juncture 21 of adjacent panel edges 18. The shroud 12 may be secured by any suitable means, such as a tie, suitably knotted line 22, or other desired securing means. An additional flexible elongate tension member or guy line 23 may extend from the securement means 22 along the adjacent panel connection for seam 16 to an upper connection formation or attachment 24 for securement to the seam 16. The tension member 23 may extend upwardly beyond the attachment 24, along the seam 16, as desired.

In FIG. 3 is shown a distender member of the present invention, generally designated 25, being a relatively stiff or rigid centrally open member, which may be fabricated of plastic, or other suitable material, as desired. In the illustrated embodiment, each distender member 25 may consist of an annulus or ring 26 centrally open, as at 27, and provided at equally spaced locations thereabout with a plurality of through holes, openings or other suitable attachment means, as at 28.

A distender member 25 is located at each juncture 21, and secured thereto by the securement or attachment 22, which may extend through a respective opening 28. Thus, each distender member 25 is located proximate to a respective juncture 21, so that the several distender members are arranged in equally spaced relation about the canopy margin 20. Further, each of the distender members 25 is swingable between a closed or collapsed position generally along or substantially coplanar with the adjacent portion of canopy margin 20, and an open or distending position disposed transverse or generally normal to the adjacent canopy portion. In the drawings, in FIGS. 1 and 2, the distender members 25 are shown in their opening or operative positions extending generally transverse or normal to the adjacent portions of canopy margin 20. However, the distenders 25 are readily swingable to lie closely along or extend generally coplanarly from the canopy margin, as desired.

There are provided a plurality of additional flexible elongate members or guy lines 30 and 31 extending from each distender member 25 to the adjacent shrouds or lines 12 and 23, respectively.

More specifically, a plurality of flexible elongate tension members or guy lines 30 extend from respective openings 28 of the annulus 26 to a meeting or attachment juncture 32 with the shroud 12 spaced below the attachment 22.

Similarly, each of the several elongate flexible members or guy lines 31 extends from a respective opening 28 to a meeting location or attachment point along line 23, say attachment point 24. The lower elongate members 30 may consist of at least three in number, as illustrated, preferably being angularly spaced apart approximately 90°; and similarly the upper elongate tension members 31 may be at least three in number, also spaced apart approximately 90°.

The several flexible elongate members or guy lines 30 may be of substantially equal length, and of a length equal to the length of shroud 12 between attachments 22 and 32. Similarly, the several elongate members or guy lines 31 may be of equal length and equal in length to the line 23 between attachments 22 and 24. Further, with the lines 12 and 23 extending away from each other, as by the exertion of a tension force on the shrouds by load 13, the flexible elongate members or lines 30 and 31 are extended and cause the distender member 25 to project inwardly from the canopy margin. By the relative lengths of lines 30 and 31, the distender 25 is, upon the application of tension to shroud 11, caused to extend transversely from the shroud margin, approximately normal thereto. This will open each shroud margin portion adjacent to the several junctures 21, and the central opening 27 of distender 25 passes air into the canopy 11 to assure opening and desired inflation of the latter. Of course, after descent of the opened parachute 10, the canopy may be refolded, as desired, to occupy a minimum of space, with the distending members 25 generally flat with respect to the adjacent canopy portions for repeated reuse in the manner described above.

From the foregoing, it is seen that the present invention provides an improved opening parachute, which is entirely reliable in operation, extremely simple in construction, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A parachute comprising a canopy of flexible sheet material having a circumferential margin, shroud lines extending from said margin to a load, a plurality of substantially rigid centrally open distender members each attached to said margin for free swinging movement between a collapsed position along and generally parallel to said margin and a distending position generally normal to and extending inwardly from said margin, and flexible elongate tension members extending between each of said distender members and one of said shroud lines and canopy, said elongate tension members being configured to hold said distender members in their distending positions when a load is applied to said shroud lines.

2. A parachute according to claim 1, said distender members each comprising an annulus.

3. A parachute according to claim 1, said distender members each being attached to said margin at a respective shroud line.

4. A parachute according to claim 3, said elongate tension members extending from spaced locations about each distender member to one of said shroud lines and margin.

5. A parachute according to claim 4, said distender members each comprising an annulus for passing air into the canopy, and said elongate members comprising at least three in number angularly spaced apart approximately 90°.

* * * * *